United States Patent [19]

Lauben

[11] 3,852,514
[45] Dec. 3, 1974

[54] NON-METALLIC LOAD CENTER HAVING HOUSING ACCOMMODATING PLURAL COVER FORMS

[75] Inventor: Robert W. Lauben, Farmington, Conn.

[73] Assignee: General Electric Company, New York, N.Y.

[22] Filed: June 14, 1973

[21] Appl. No.: 369,868

[52] U.S. Cl................. 174/58, 220/3.8, 220/3.9, 317/120
[51] Int. Cl. ....................................... H05k 5/03
[58] Field of Search .......... 174/58, 59, 60; 317/119, 317/120; 220/3.8, 3.9

[56] References Cited
UNITED STATES PATENTS

| | | |
|---|---|---|
| 2,643,363 | 6/1953 | Robertson et al. ............... 174/59 X |
| 2,851,325 | 9/1958 | Moor .............................. 220/3.9 X |
| 3,033,913 | 5/1962 | Dietze .................................. 174/60 |
| 3,376,542 | 4/1968 | Vlaminck ...................... 174/60 UX |

Primary Examiner—E. A. Goldberg
Assistant Examiner—David A. Tone

[57] ABSTRACT

A non-metallic panelboard comprises an insulative, molded plastic enclosure consisting of a housing having integrally formed back and sidewalls and a separable cover. The housing is adapted for both surface mounting to a finished wall and mounting to a wall stud in recessed relation to the finished wall. The housing is also adapted to accept two cover forms; one in the situation where the housing is surface mounted and the other in the situation where the housing is recessed mounted.

6 Claims, 5 Drawing Figures

NON-METALLIC LOAD CENTER HAVING HOUSING ACCOMMODATING PLURAL COVER FORMS

BACKGROUND OF THE INVENTION

Heretofore, enclosures for electrical equipment, such as circuit breaker panelboards or load centers, have invariably been metallic. These metallic enclosures are manufactured in mass production from metal sheets in a succession of operations, including cutting, blanking, forming and welding, to create a box-like housing, which must then be painted. The enclosure covers are similarly produced in a succession of operations. A number of components, including component mounting and supporting elements, must then be assembled in the box-like housing. Since the metallic enclosure is electrically conductive, insulation must be incorporated into the mounting of the various bus bars to the enclosure.

A non-metallic, molded plastic electrical equipment enclosure in the form of a circuit breaker panelboard or load center has been introduced in the market and offers numerous advantages over its metallic counterpart. The complete box-like housing can be created in a single molding operation, as can the cover. Painting is unnecessary, and the plastic can be readily tinted and the mold designed to create a surface finish which is esthetically pleasing. Moreover, mounting and supporting elements may be integrally formed with the enclosure, thus simplifying assembly. In this context, the assembly of separate insulating members is obviated since the enclosure itself is an insulator. As a consequence, a molded plastic enclosure is less expensive to manufacture in mass production than a comparable metallic enclosure. Moreover, electricians have found a molded plastic enclosure more convenient to install and wire.

It is accordingly an object of the present invention to provide a non-metallic, molded plastic enclosure for electrical equipment.

An additional object of the invention is to provide a non-metallic enclosure of the above character adaptable to both surface wall mounting and recessed or flush wall mounting.

Still another object of the invention is to provide a molded plastic enclosure of the above character having two cover forms, one for surface wall mounting and the other for recessed or flush wall mounting.

Other objects of the invention will in part be obvious and will in part appear hereinafter.

The invention accordingly comprises the features of construction, combinations of elements, and arrangements of parts which will be exemplified in the construction hereinafter set forth, and the scope of the invention will be indicated in the claims.

SUMMARY OF THE INVENTION

In accordance with the invention, there is provided a non-metallic molded plastic enclosure for electrical equipment, such as a panelboard or load center for circuit breakers, having integrally formed back and sidewalls in the configuration of a box-like housing. A separable molded plastic cover in either of two forms is adapted to the housing to complete the enclosure. Mounting provisions integrally formed with the housing are susceptible to surface mounting of the enclosure to the face of a wall or recessed mounting of the enclosure within the wall, as desired by the installer.

More specifically, the housing sidewalls terminate in a perimetrical lip circumscribing the open front of the housing; the lip telescopically interfitting with a corresponding perimetrical flange molded to and depending from the front wall of the cover pursuant to the application of the cover into closure relation with the housing. In one cover form, the housing lip telescopes within the cover flange which depends from the front wall along the edges thereof. This cover form is used when the enclosure is to be surface mounted to a finished wall. In the other cover form, the flange depends from the front wall in set back relation to the edges thereof and is telescopically received within the housing lip. This flush mounting leaves marginal portions of the cover front wall extending beyond the housing sidewalls to be in overlapping relation to the finished wall when the enclosure is recessed mounted to a wall stud. The housing is also provided with dual means for securing both cover forms thereto in closure relation to the open front thereof.

BRIEF DESCRIPTION OF THE DRAWINGS

For a fuller understanding of the nature and objects of the invention, reference should be had to the following detailed description taken in connection with the accompanying drawings on which.

Like reference numerals refer to corresponding parts throughout the several views in the drawing lines.

DETAILED DESCRIPTION

Figure 1:
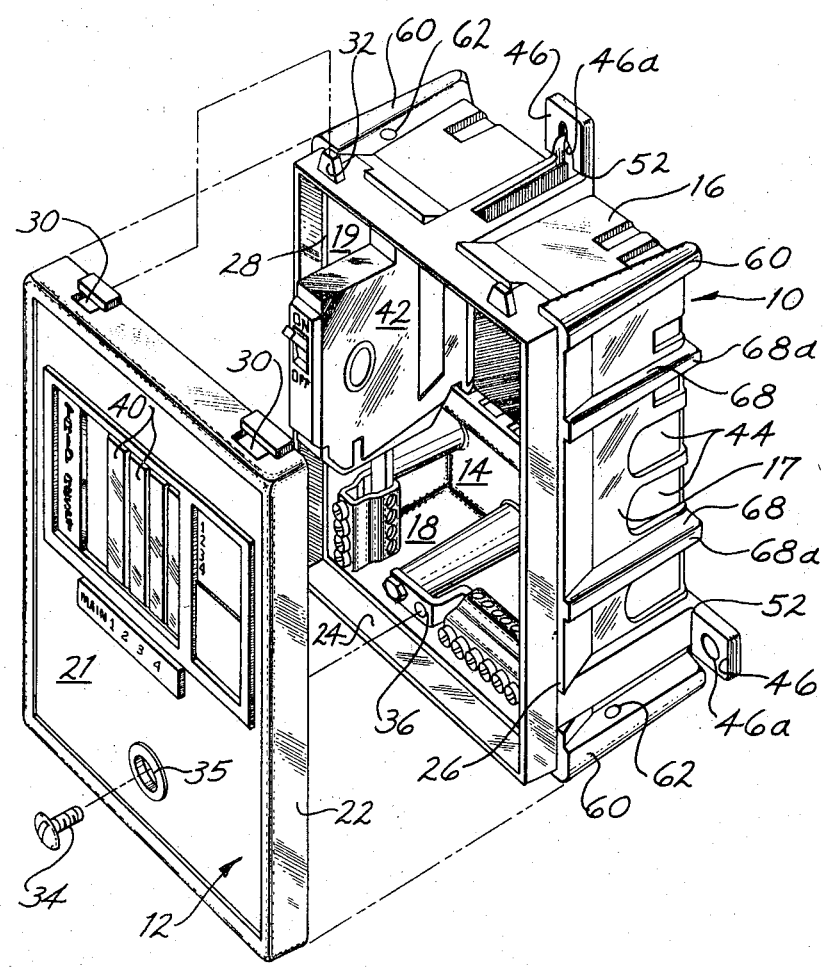
FIG. 1 is a perspective view of a non-metallic panelboard for electrical equipment constructed in accordance with the invention to include a molded plastic, box-like housing and a separable molded plastic cover.

A non-metallic panelboard for electrical equipment, constructed in accordance with the invention, is seen in FIG. 1 to include a molded plastic, box-shaped housing, generally indicated at 10, and a molded plastic cover, generally indicated at 12. The housing and cover are formed of a suitable plastic, preferably a thermoplastic material, such as phenylene-oxide thermoplastic marketed by General Electric under the trademark NORYL. However, thermoset materials may also be used. The housing 10 comprises a backwall 14 and four integral sidewalls 16, 17, 18 and 19. Cover 12, like housing 10, is formed in a single molding operation to include a front wall 21 and shallow sidewalls in the form of a perimetrical flange 22.

The housing sidewalls terminate in a perimetrical lip 24 surrounding the open front of housing 10. Adjacent the base of lip 24, the housing sidewall thickness is reduced to provide an outer ledge 26 circumscribing the outside perimeter of housing 10 and an inner ledge 28 circumscribing the inner perimeter; both of the ledges being in equally recessed relation to the open front of housing 10.

Figure 3:
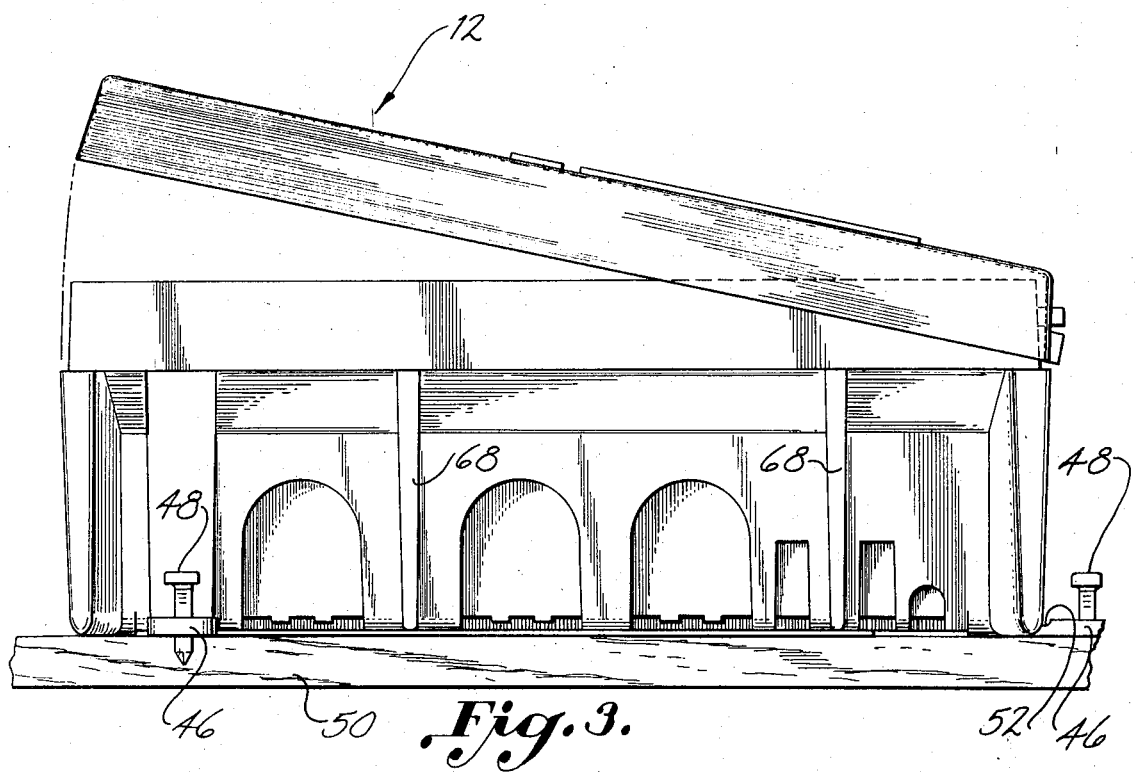
FIG. 3 is a side elevational view of the housing and cover form of FIG. 1 illustrating surface mounting of the panelboard.

Referring to FIGS. 1 and 3, cover 12 is mounted to housing 10 by forming a pair of openings 30 in the upper horizontal portion of perimetrical flange 22 which receive upstanding, pyramidal-shaped hooks 32 integrally formed with the upper portion of housing lip 24. As best seen in FIG. 3, with hooks 32 engaged in openings 30 cover 12 is pivoted downwardly on housing 10 with lip 24 telescopically received within cover flange 22. To hold cover 12 in place, a screw 34 passes through an aperture 35 in the cover front wall 21 and into threaded engagement with a hole 36 formed in an equipment ground bus 38 mounted within housing 10. As seen in FIG. 1, the front wall 21 of cover 12 is molded to provide a row of knockouts 40 which are selectively removed to provide apertures accommodating the protrusion, with the cover in place, of the digitally operative portion of circuit breakers installed in housing 10, one being shown so installed at 42. The backwall and sidewalls of housing 10 are also molded to provide a series of conveniently located knockouts 44 which are selectively removed to accommodate introduction of cable during wiring installation of the enclosure.

The housing cover form seen in FIGS. 1 and 3 is utilized for those installations where the enclosure is to be surface mounted to a wall. To facilitate surface mounting, exterior mounting tabs 46 are integrally formed with three of the four housing sidewalls. Each tab is provided with an aperture 46a through which a nail 48 (FIG. 3) or other suitable fastening element may be driven into a wall 50 to, in effect, hang the enclosure thereto. It will be appreciated that the number of such mounting tabs 46 and their locations along the housing sidewalls at their junctions with the backwall 14 is strictly a matter of design and in no way limiting of the invention. Each of the mounting tabs is formed having a score line or groove 52 adjacent the junction of the individual tab with the housing sidewall to facilitate their being broken off by a pliers so as not to interfere with the recessed mounting of the enclosure within a wall at the site of installation. The structure of housing 10 lending to flush or recessed mounting of the enclosure will now be described.

Figure 4:
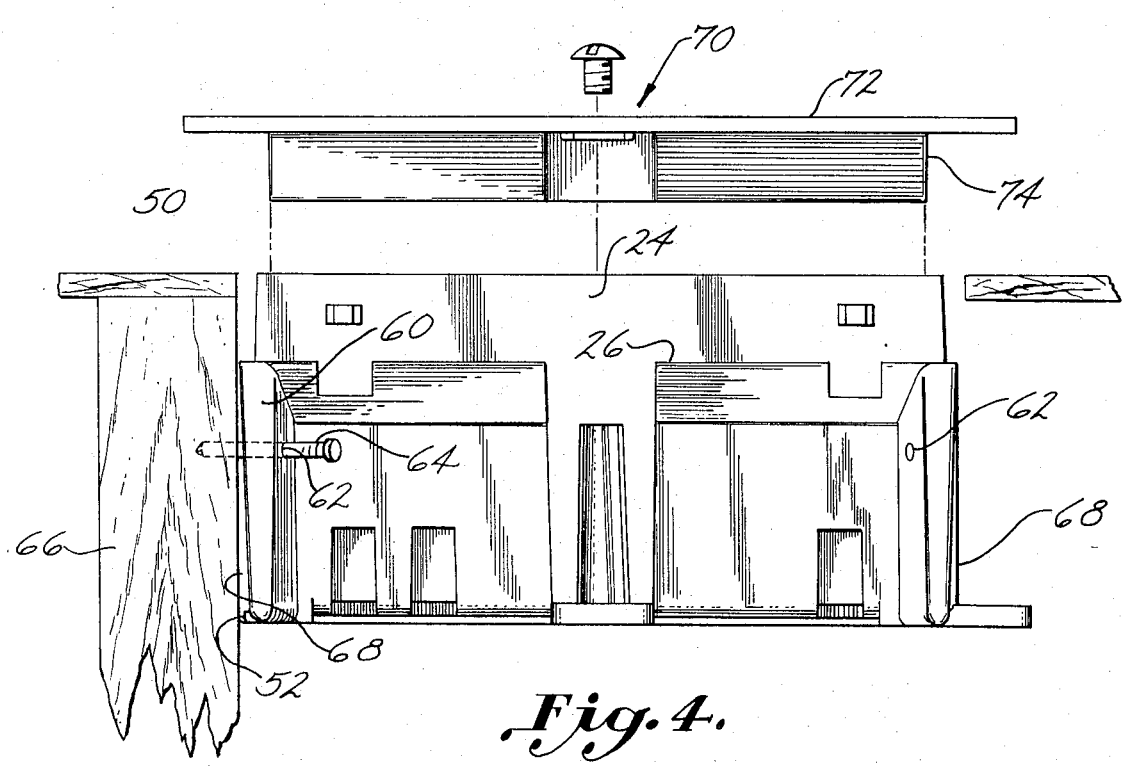
FIG. 4 is a side elevational view of the panelboard of FIG. 2 in recessed mounted relation to a wall stud.

As seen in FIG. 1, each corner of housing 10 is formed with a rib 60 which is relatively large in cross section at its end terminating at the outer ledge 26 and tapers down to a smaller cross section at its other end adjacent the housing backwall 14. Not only does the cross section of ribs 60 decrease going from the ledge 26 toward the housing backwall 14, but also, as seen in FIG. 4, it also tapers inwardly toward the corner of the sidewalls and the backwall. This tapering of the corner ribs is for the purpose of facilitating release of the housing from the mold cavity during manufacture. While the corner ribs 60 provide a measure of reinforcement, their principal function is to provide sufficient material to accommodate the drilling of a nail hole 62 adjacent its end of larger cross section. These nail holes 62 are pre-drilled at an angle of approximately 45° from each sidewall to accommodate the passage of a nail 64 (FIGS. 2 and 4) for toe-nailing into the side of a wall stud, indicated at 66, pursuant to recessed mounting of the enclosure within a wall.

Figure 5:
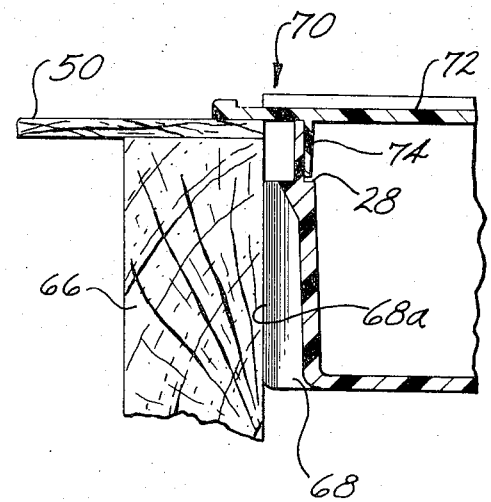
FIG. 5 is a sectional view taken along line 5—5 of FIG. 2.
Figure 2:
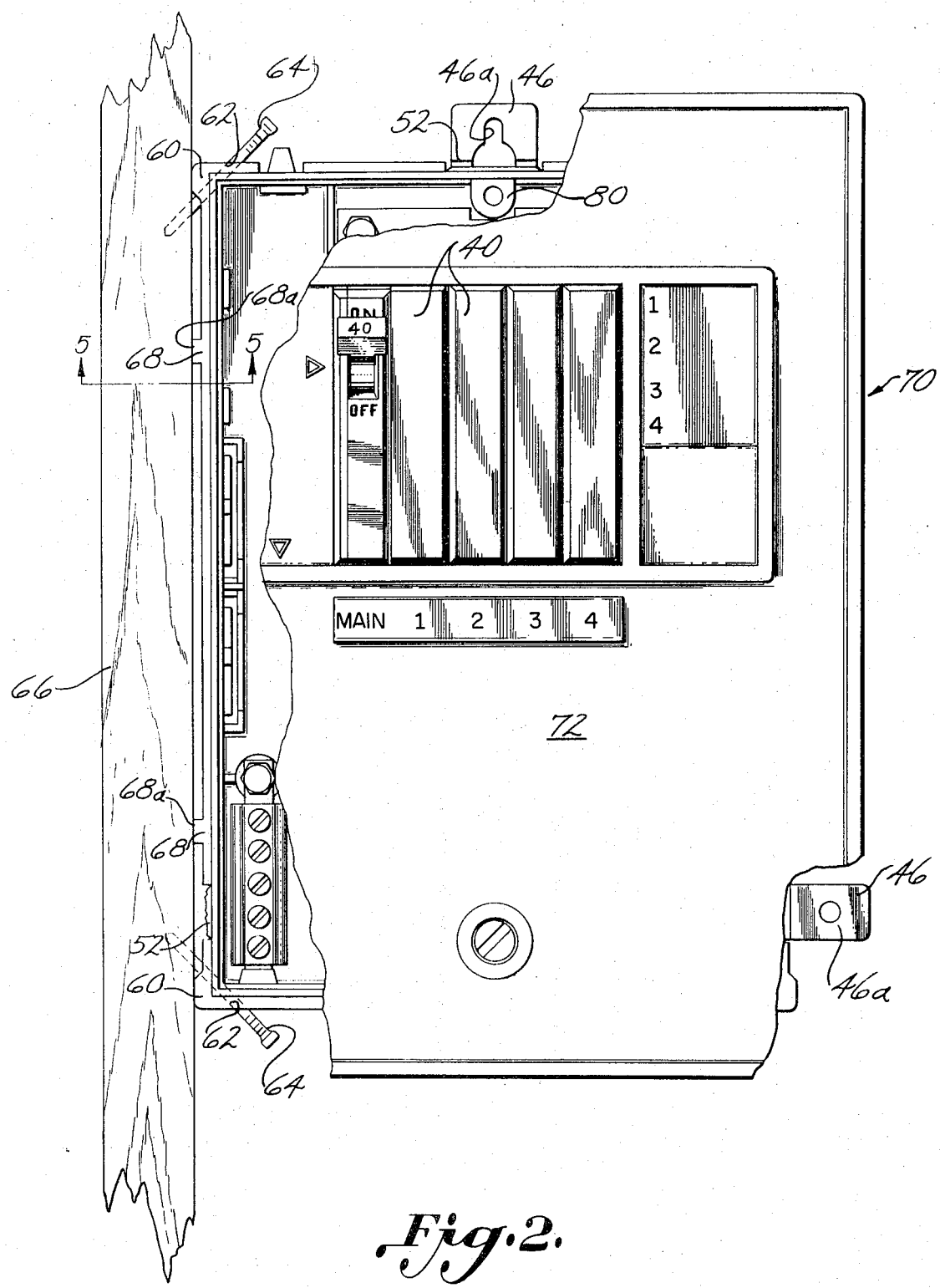
FIG. 2 is a plan view, partially broken away, illustrating recessed or flush mounting of the housing of FIG. 1 in combination with an alternative cover construction.

In order to insure proper recessed flush mounting of the enclosure wherein the open front of the housing is substantially squared with the side surface of the wall stud 66 and consequently parallel to the finished wall, a pair of reinforcing ribs 68 integrally formed with each of opposed housing sidewalls 17 and 19 are provided intermediate the corner ribs 60. As best seen in FIG. 3, each rib 68 is of relatively narrow width and is further tapered such that its width adjacent lip 24 is somewhat greater than its width adjacent housing backwall 14. By virtue of their relatively narrow, tapered width, the faces 68a of the ribs common to a housing sidewall can be made to lie in a plane substantially perpendicular to the open face of housing 12 and still afford facile release from the mold cavity. The faces of these ribs 68 thus provide bearing surfaces which abut against the side of the wall stud 66, as seen in FIG. 5, when the enclosure is nailed in place to automatically orient the open front of the housing 10 in substantially parallel relation to the finished surface of wall 50. Also, as seen in FIG. 2, the outer ends of corner ribs 60 also provide face surface portions lying in the plane of rib mounting faces 68a to also bear against the stud 66. These additional bearings surfaces, though not necessary to insure squared recessed mounting, do provide backing adjacent nail holes 62 to reduce the possibility of damaging or disorienting the enclosure during toe-nailing to the wall stud.

When the housing 10 is recess or flush mounted, as illustrated in FIGS. 2 and 4, a different cover form than cover 12 is used to complete the enclosure. This cover, generally indicated at 70, is integrally formed having a front wall 72 somewhat dimensionally larger than the open front of housing 12. A perimetrical flange 74 is integrally formed to depend from the back side of front wall 72 with each side thereof in set back relation to the corresponding edge of the cover front wall. The flange 74 is so located and dimensioned so as to telescopically fit within housing lip 24 when cover 70 is adapted to housing 10. The inside, rather than the outside, fit of flange 74 to lip 24 is necessary in order to avoid having to incorporate notches or reliefs in the cover flange to avoid interference with hooks 32 used in mounting cover 12 (FIG. 1). As seen in FIGS. 4 and 5, the overhanging edges of cover front wall 72 beyond flange 74 conveniently overlap the finished wall 50 when cover 70 is mounted to housing 12, thus providing a neat and esthetically pleasing enclosure installation. It is noted from FIG. 4 that mounting tab 46 is removed along score line or groove 52 so as not to interfere with stud 66 during recessed mounting of the enclosure. To secure cover 70 in place, two screws are used, rather than one in the case of cover 12. Screw 34 passes through hole 35 in front wall 72 into threaded engagement with hole 36 in bus 38 (FIG. 1) while a second screw (not shown) passes through a hole into threaded engagement with a mounting post 80 (FIG. 2) integrally formed with sidewall 16 and backwall 14. The outer portion of post 80 is set back from lip 24 so as not to interfere with cover flange 74 upon mounting cover 70 in closure relation to housing 10.

From the foregoing description, it is seen that the present invention affords an improved non-metallic enclosure housing construction universally designed for both surface mounting on and recessed or flush mounting in a wall. This dual adaptability significantly reduces manufacturing costs, simplifies production and lessens inventory expense as compared to a situation where different housing constructions are required for the two manners of enclosure installation. Moreover, the housing construction of the invention lends itself to convenient and expeditious on-site installation by electricians.

It will thus be seen that the objects set forth above, among those made apparent in the preceding description, are efficiently attained and, since certain changes may be made in the above constructions without departing from the scope of the invention, it is intended that all matter contained in the above description shown in the accompanying drawings shall be interpreted as illustrative and not in a limiting sense.

Having described our invention, what we claim as new and desire to secure by letters Patent is:

1. A non-metallic enclosure for electrical equipment comprising, in combination:
   A. a molded, electrically insulative housing including a backwall and integrally formed, upstanding sidewalls, said sidewalls terminating in a perimetrical lip circumscribing the open front of said housing;
   B. first mounting means integrally formed with said housing externally of said sidewalls facilitating the mounting of said enclosure to the surface of a wall;
   C. second mounting means integrally formed with said housing externally of said sidewalls facilitating mounting of said housing to a wall stud in recessed relation to the wall surface;
   D. a molded insulative cover for said housing, said cover including a rectangular front wall and an integrally formed, perimetrical flange depending from said front wall, said flange telescopically interfitting with said lip in closure relation to the open front thereof;
   E. first attachment means integrally formed with said housing facilitating attachment of said cover to said housing when mounted to a wall surface; and
   F. second attachment means integrally formed with said housing facilitating attachment of said cover to said housing when mounted in recessed relation to a wall surface.

2. The enclosure defined in claim 1, wherein said lip is formed of reduced thickness relative to said sidewalls whereby to create inner and outer, equally recessed perimetrical ledges at the junction of said lip and said sidewalls, whereby said lip is structured to telescopically interfit with said flange.

3. The non-metallic enclosure defined in claim 1, wherein said perimetrical flange depends from said cover front wall along the edges thereof, whereby said lip is telescopically received within said flange.

4. The enclosure defined in claim 3, wherein said first attachment means includes:
   1. molded hooks integrally formed with said lip,
   2. apertures formed in said flange at locations to receive said hooks pursuant to mounting said cover to said housing, and
   3. a screw passing through a hole in said front wall into threaded engagement with screw accommodating means included with said housing, whereby to secure said cover to said housing.

5. The enclosure defined in claim 1, wherein said perimetrical flange depends from the back side of said front wall in set back relation to the edges thereof, whereby said flange is telescopically received within said lip, and the marginal portions of said front wall beyond said flange overlap a wall surface upon recessed mounting of said housing.

6. The enclosure defined in claim 5, wherein said second attachment means includes:
   1. first and second screw accommodating means carried by said housing adjacent opposed sidewalls, and
   2. a pair of screws passing through holes formed in said front wall of said cover into threaded engagement with respective first and second screw accommodating means, whereby to secure said cover to said housing.

* * * * *